Sept. 17, 1929.  A. F. MASURY  1,728,870
FLEXIBLE CONNECTION FOR MOTOR VEHICLE PANELS
Filed Sept. 1, 1928
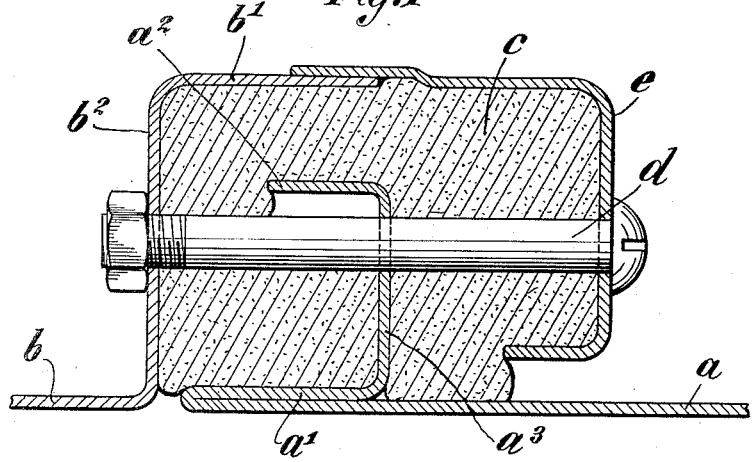
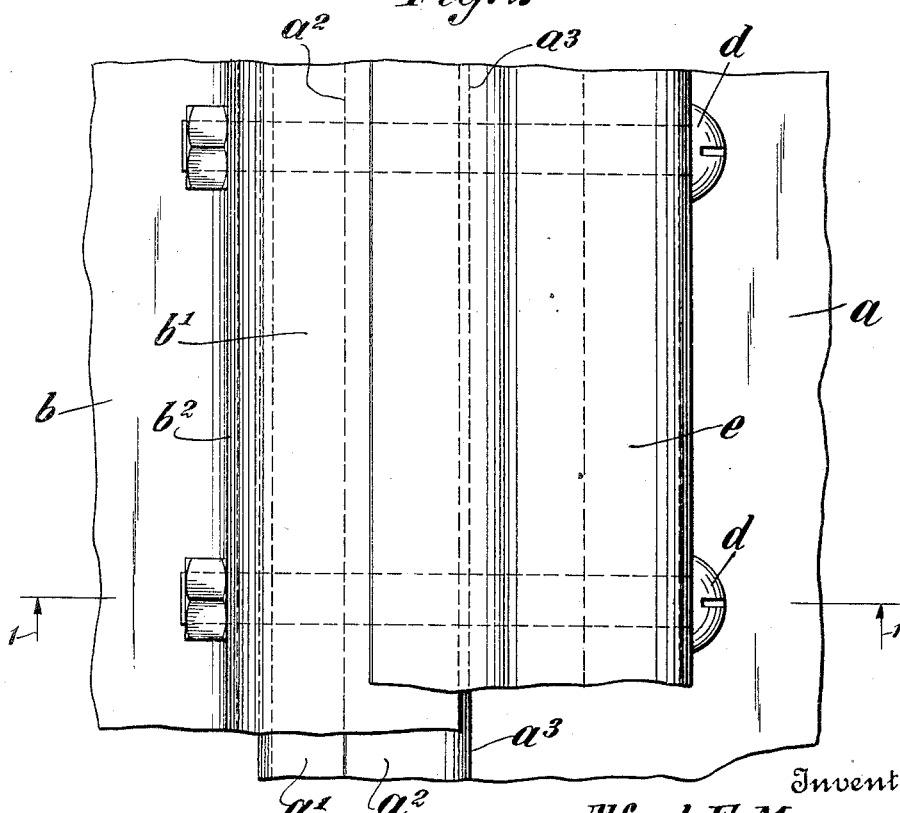
Inventor
Alfred F. Masury,
By his Attorneys
Redding, Greeley, O'Shea & Campbell Patented Sept. 17, 1929

1,728,870

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,461.

The present invention relates to panelling adapted for use particularly in connection with motor vehicles, and includes an improved connection whereby adjacent panels are secured together effectively in a manner to impart flexibility thereto, at the same time eliminating objectionable body noises, such as squeaks and drumming of the vehicle body while travelling.

An object of the invention is to provide a connection of the above character which will enable the panels to be replaced readily when damaged, at the same time connecting adjacent panels through a wholly non-metallic and yielding connection so that vibrations will not be transmitted from one panel to another. By means of the present invention, vehicle bodies of this type can be manufactured in quantity by the present manufacturing methods of stamping rather than by hand assembly, thus materially reducing the cost thereof. The fundamental idea underlying the connection is that the edges of the panel are turned, rubber moulding being formed to engage the turned edges and clamped under compression by suitable bolts as described hereinafter.

Further objects will appear as the description of the invention proceeds and reference will now be had to the accompanying drawings, wherein:

Figure 1 is a view in section taken on line 1—1 of Figure 2 and looking in the direction of the arrows, showing one form of connection.

Figure 2 is a plan view of the connection shown in Figure 1.

Referring to the above drawings, $a$ designates a panel provided with a turned back portion $a'$, the extension of which forms an L-shaped re-entrant portion having a flange $a^3$ which extends upwardly from the panel $a$ and an extension $a^2$ which is parallel to the panel $a$. The adjacent panel $b$ is formed with an angled extension having a parallel portion $b'$ and a portion $b^2$ perpendicular to the panel $b$. Surrounding the extension $a^2$—$a^3$, is a strip of non-metallic yielding moulding $c$ formed to space the panels $a$ and $b$ apart. This moulding is preferably made of rubber and maintained under compression by means of a bolt $d$ which engages the portion $b^2$ and passes through the portion $a^3$. A suitable strip $e$ is formed to engage, telescopically, the extension $b'$ and form a means for enclosing and confining the rubber moulding $c$. It will be seen that this moulding may be placed under any desired degree of compression by adjusting the tension set up by the bolt $d$.

Slight modifications of the above construction will be quite apparent to those skilled in the art and the invention is not to be limited, save as defined in the appended claims.

I claim as my invention:

1. A device of the character described comprising a panel, an adjacent panel to be connected thereto, a flange on the first panel perpendicular thereto, an extension on the flange parallel to the first panel and extending toward the second panel, a flange on the second panel extending perpendicularly thereto, an extension on the last named flange overlying the first extension and parallel to the second panel, a non-metallic yielding moulding mounted between the panels and spacing them apart, a cover strip telescopically engaging the second extension to enclose the moulding, and means to secure the strip flanges and moulding together.

2. A device of the character described comprising a panel, an adjacent panel to be connected thereto, a reversely extending portion on the first panel, a flange on the reversely extending portion perpendicular to the panel, an extension on the panel parallel thereto, a flange on the second panel perpendicular thereto, an extension on the second flange parallel to the panel and spaced from the extension on the first flange, non-metallic yielding moulding between the panels and lying between the flanges and extensions, a cover strip telescopically engaging the extension on the second flange to enclose the moulding, and means to secure the flanges, strip and moulding together.

This specification signed this 27th day of August, A. D. 1928.

ALFRED F. MASURY.